Sept. 27, 1966 M. R. FOSTER 3,275,980
METHODS OF INVERSE FILTERING GEOPHYSICAL DATA
Filed May 29, 1963 5 Sheets-Sheet 1

MANUS R. FOSTER
INVENTOR.

BY *William Scheback*
ATTORNEY.

MANUS R. FOSTER
INVENTOR.

BY
ATTORNEY.

Sept. 27, 1966  M. R. FOSTER  3,275,980
METHODS OF INVERSE FILTERING GEOPHYSICAL DATA
Filed May 29, 1963  5 Sheets-Sheet 3

MANUS R. FOSTER
INVENTOR.

BY *William H. Schalback*
ATTORNEY.

United States Patent Office 3,275,980
Patented Sept. 27, 1966

3,275,980
METHODS OF INVERSE FILTERING
GEOPHYSICAL DATA
Manus R. Foster, Irving, Tex., assignor to Mobil Oil
Corporation, a corporation of New York
Filed May 29, 1963, Ser. No. 284,256
8 Claims. (Cl. 340—15.5)

This invention relates to methods of and apparatus for improving the resolution of geophysical data and more particularly to the inverse filtering of geophysical data in order to render data more representative of a measured characteristic of subsurface earth formations, and has for an object improving the revolution of geophysical data derived by systems whose impulse response includes that of a smoothing operator.

While the present invention will be useful in the processing of any geophysical data which has been obtained by way of a system whose impulse response includes that of an averaging operator, it is particularly useful to improve the resolution of well logging data. This data includes induction logs and acoustic velocity logs. Systems that are employed for obtaining such logs include a plurality of transducers, at least one of which is a source of primary energy and another of which is a detector of energy which has arrived at the detector by way of the earth formation. And they all include one thing in common; they all produced data filtered by smoothing operators. While the present invention is applicable to smoothed data to improve resolution, its application to velocity logs for the improvement of their resolution as described in a paper authored by the applicant and co-employees of his assignee appearing in Geophysics of June 1962, pages 317–326 and entitled, "Optimum Inverse Filters Which Shorten the Spacing of Velocity Logs," will be taken as exemplary of problems encountered and the manner in which the present invention is applicable.

In a typical velocity logging system acoustic energy generated at a transmitting transducer is refracted along a path through an earth formation adjoining a borehole and thence to one or more detecting transducers. Suitable time interval measuring devices, either uphole or downhole, are employed to sense the appearance of acoustic energy at two of the transducers in order to measure the travel time of acoustic energy along the refracted path. It has long been realized that improved resolution is obtained if the transducers employed in the time interval measurement are placed very close to one another along the length of the borehole. However, while the resultant information gives the appearance of improved resolution, the data obtained is not as reliable as that obtained when the transducers are spaced further apart. With close spacing between transducers, the energy travels along a path close to the borehole wall where the formation is likely to be contaminated by invasion of borehole fluids or to be physically damaged, particularly in shale zones where sloughing takes place. On the other hand, the information obtained with longer spacing between the transducers is more accurate. This is by reason of the fact that the detected energy has traveled along a path deeper in the formation where it is likely that the formation has been contaminated by borehole fluids or otherwise physically affected. However, while the information regarding velocity and time measurements is more accurate, much is left to be desired regarding resolution since the formations or beds of interest may be thinner or otherwise have an effective length much less than the length or spacing between the transducers.

But both types of logs are desirable the long spacing for geophysical total travel time studies and the short spacing for detail analysis for the subsurface layering. Both are realizable by the present invention with but one run of the logging tool along the borehole.

In accordance with the present invention, there is provided in geophysical exploration the method which comprises generating as a dependent variable a function controlled by an earth characteristic and which function has been filtered by any operator whose impulse response includes a smoothing characteristic. This filtered function is now passed through a system having an impulse response which converts the smoothing characteristic to a spike function to render the variable function more representative of the earth characteristic and more free from system distortion.

The result of such operation as applied to a log of interval travel time will be a log that would have been obtained had the transducers been located very close to one another, for example, 0.5 foot apart, and in which the refraction path had been uncontaminated and physically otherwise unaffected.

With such information, it is now possible to carry out a further step of the present invention wherein a moving-average operator is applied to the transformed well logged data to smooth out the representation of the transformed log and to derive therefrom a log that would have been obtained if the spacing of the transducers was intermediate the above-described smallest spacing and the actual spacing of the transducers in the system employed to obtain the original data.

Whenever data is obtained by way of a well logging tool, particularly of the acoustic velocity type, there invariably occurs in the data a high amplitude spike due to banging of the tool against the borehole. This noise spike must be removed from the original data prior to processing. Thus, in accordance with the present invention, there is provided the step of removing said noise spike from the original data prior to processing with the inverse filter.

For other objects and attendant advantages of the present invention, reference may now be had to the following detailed description taken in conjunction with the accompanying drawings wherein:

FIGURE 1 is a schematic representation of a typical well logging system;

FIGURES 2A and 2B, respectively, are portions of an actual long spacing velocity log and a synthetic short spacing velocity log derived therefrom in accordance with the present invention;

Figure 7A:
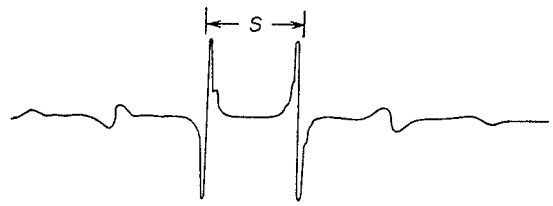
Figure 7B:
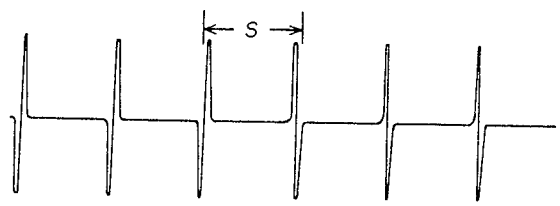
Figure 8:
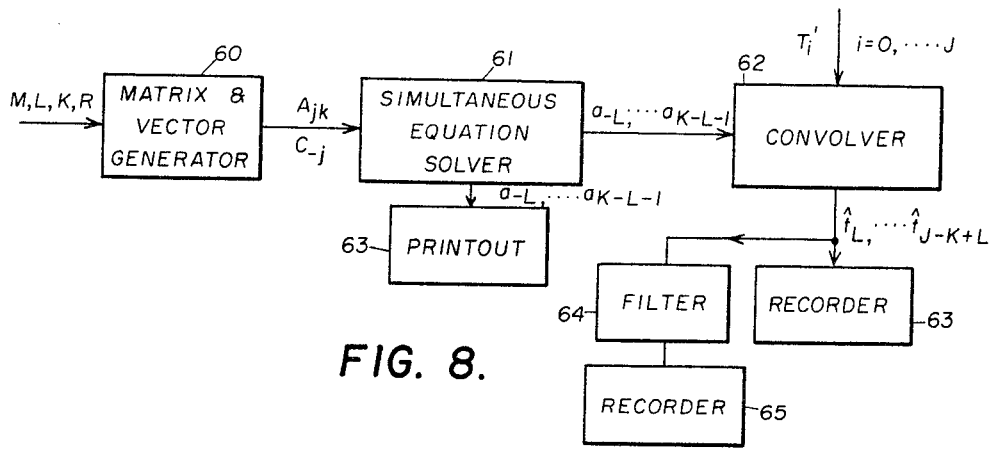
Figure 9:
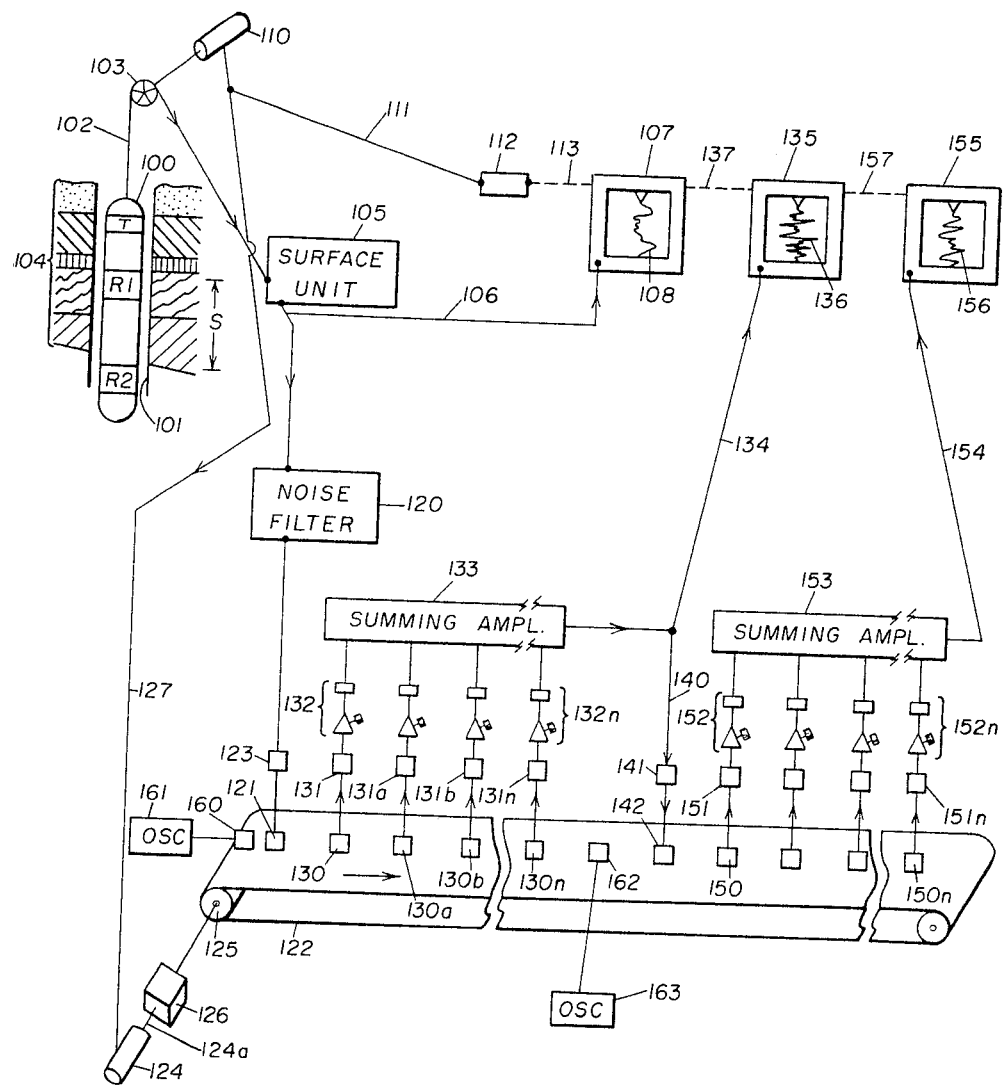
Figure 10:
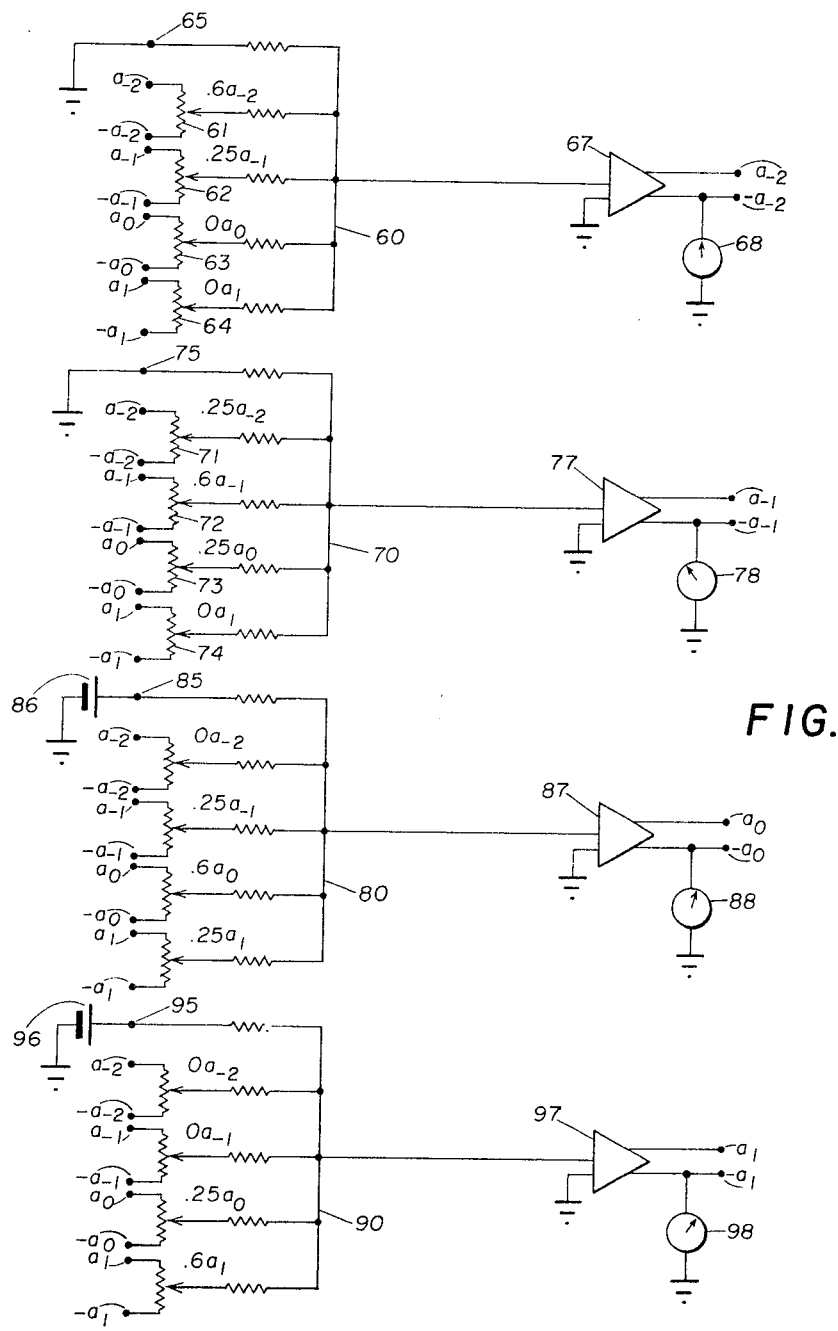

FIGURES 7A and 7B, respectively, illustrate the impulse response of an optimum inverse filter of finite memory length and an exact inverse filter;

FIGURE 8 diagrammatically illustrates in block schematic form a more detailed arrangement of a digital system for performing the method of the present invention;

FIGURE 9 schematically illustrates an analog system for carrying out a method of the present invention and useful for field operations; and FIGURE 10 illustrates an analog computer for solving simultaneous equations.

Figure 1:
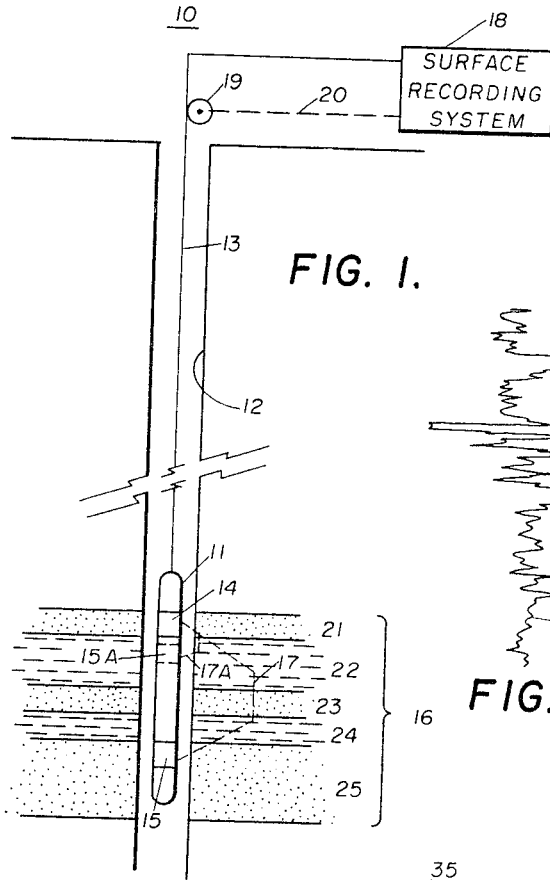

Referring now to the drawings and more particularly to FIGURE 1, there is illustrated a system 10 which will generate a geophysically dependent variable and which system has an impulse response which includes a smoothing characteristic. As illustrated, the ssytem 10 is a well logging system which includes a downhole tool 11 lowered through a borehole 12 by way of a cable 13. The downhole tool 11 includes a source 14 of primary energy and a detector 15. Energy is received at the detector 15 after passing through the formation 16 by way of a path 17. The type of source and detector will vary with the logging system employed: If an electric logging tool, the source 14 and the detector 15 will be electrodes spaced from one another a predetermined distance; if a radioactive logging tool, the source 14 will be a source of neutrons or gamma rays and the detector 15 will be a detector of the secondary radiation emitted from the formation 16 by reason of excitation of material therein by the primary radiation from the source 14; if a velocity logging tool, the source 14 will be a transmitter of acoustic energy and the detector 15 will be a receiver of energy including that energy refracted along a path through the formation 16. While the present invention is applicable to any geophysical prospecting system including well logging systems, which systems include in their impulse response an averaging operator, the present invention will be described specifically with respect to a velocity logging tool, for example, of the type illustrated in U.S. Patent 2,704,364, issued to Gerald C. Summers.

In a typical velocity logging system, the acoustic energy appearing at the transmitter 14 is employed to trigger a time measuring system employed in the surface recording system 18. Upon appearance of the acoustic energy at the receiver 15, the surface recording system 18 responds thereto by reason of coupling to the transmitter and receiver by way of cable 13 to generate a time interval function representative of the time of travel of acoustic energy along the path 17 through the formation. The surface recording system is mechanically coupled by way of a sheave 19 and a mechanical connection 20 to the cable 13 so that the time interval function may be plotted as a function of the depth or position of the logging tool 11 in the borehole 12. This information is useful in determining the characteristic or geophysical condition of the formation 16 adjacent the wellbore and in identifying earth layering.

Figures 2A, 2B:
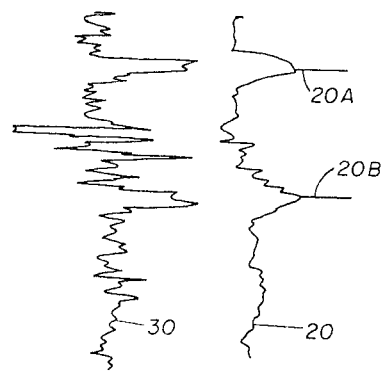

A typical log produced by way of the system above described is illustrated as the trace 20 of FIGURE 2A. While the information contained therein is useful, it can now be readily appreciated by examination of the typical formation layering in FIGURE 1 that the velocity information derived is the average of the velocities or time intervals of the earth layers 21, 22, 23, 24, and 25. In many instances it is desirable to have more definitive information regarding the characteristics of these layers and otherwise obtain a higher resolution of the information from the logging tool. One way of accomplishing this is to move the detector or receiver 15 closer to the transmitter 14 as shown by the dotted lines and identified as detector or receiver 15A. With the spacing between the transmitter 14 and the receiver 15A small enough as not to exceed the thickness of any earth layer of interest, there will be generated a log of the type approximating trace 30 of FIGURE 2B. However, while the resolution seemingly may be improved by such modification, the data is not always reliable. It will be observed that under conditions of close spacing, the energy between the transmitter 14 and the detector 15A now travels by way of the path 17A which is very much closer to the edge of the borehole wall and through a portion of the formation very susceptible to damage either by way of invasion of wellbore fluids or other physical damage, such as sloughing in the shale zones, to increase or otherwise vary the diameter of the wellbore from true gauge.

In accordance with the present invention, it is now possible to obtain information by way of the more remote path 17 where the formations are less prone to physical damage and which information more accurately reflects the interval velocity characteristics of those earth layers and by manipulation of the data to synthetically produce the trace 30. The trace is an actual reproduction of a synthetic velocity log produced by the present invention. It represents data that could only have been obtained with the transmitter-to-receiver spacing of approximately 0.5 foot and from the undamaged portions of the formations. The method of the present invention is carried out broadly by an arrangement illustrated in FIGURE 3 wherein the original data as represented by the trace 20 of FIGURE 2A is reproduced by way of a suitable playback system 35 and applied by way of a noise removal filter 36 to an inverse filter 37. The inverse filter 37 is effectively a second system which is characterized by an impulse response which is the inverse of the logging system. The filter 37 operates upon the data to remove the distortion introduced by the averaging characteristic of the first system and to replace it with a spike characteristic thereby to apply to the recorder 38 a velocity log effectively of shorter spacing.

Figure 3:
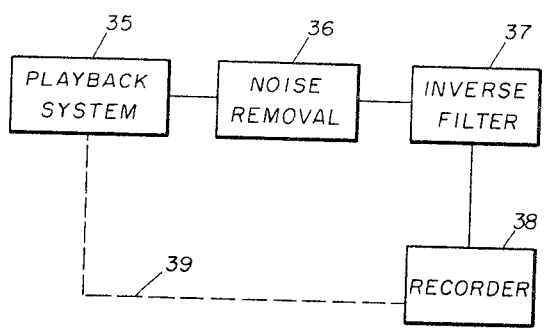
FIGURE 3 illustrates in block schematic form a typical arrangement of the present invention.

The system of FIGURE 3 may be an analog system or it may be a digital system. The playback system may include, for example, a device suitable for tracing the original recording of the velocity log in the manner illustrated in FIGURE 5 of U.S. Patent 3,008,120, issued to W. G. Hicks, in order to produce an electrical signal representation of the velocity or incremental time information contained in the velocity log.

The noise removal system 36 can take the form of a low-pass filter for the purpose primarily of removing noise spikes 20A and 20B appearing as part of the trace 20 and which usually are introduced by reason of banging of the logging tool 11 against the walls of the borehole. This information or noise must be removed prior to processing; otherwise, serious error will be introduced in the generation of the synthetic velocity log of FIGURE 2B. On the other hand, the noise spikes may be removed by the playback system 35 if it is of the type above mentioned, that is, FIGURE 5 of the Hicks patent. In this case, the logging information is reproduced by an operator who visually detects the presence of the noise spikes and controls a follower to avoid reproduction of those spikes in the electrical signal.

The inverse filter 37 may be provided by a digital computer. A Control Data Corporation Model 1604 is suitable. The filter 37 may be also provided by an analog time domain filter of the type included in the field system of FIGURE 9.

In order to disclose the manner in which the inverse filter is determined either for the digital or analog processing, it will be desirable now to present a discussion of background theory. It is within the scope of the present invention to calculate the inverse function by using a digital computer, an electrical or magnetic delay line, or a time domain filter. That these various approaches are suitable will be evident from the following.

The velocity logging instrument 11, FIGURE 1, measures the travel time of a compressional pulse over a distance S which will be called the spacing between the transducers employed in the travel time determination. In a single-detector system, the spacing involved is that approximately of the separation of the source 14 and the detector 15. For two-receiver systems, the spacing S involved is the separation between the receivers. Ideally, the instrument should be capable of resolving incremental time intervals or velocities over the smallest increment of distance along the wellbore as may be useful to the geologist or geophysicist interpreting the log. This distance can be as small as 0.5 foot, or smaller.

Figure 5:
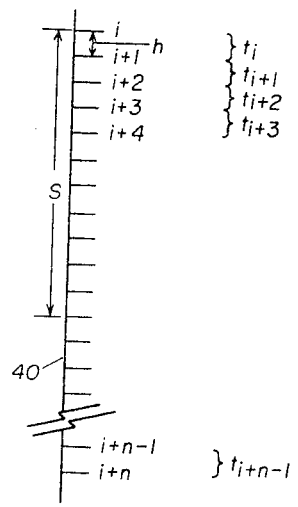
FIGURES 5 and 6 are illustrations of information useful in the understanding of the present invention.

Referring now to FIGURE 5, each of the smallest incremental distances of interest is labeled $h$. The time required for a compressional pulse to travel a distance $h$ between the points $i$ and $i+1$ is $t_i$. Likewise, the time required for a compressional pulse to travel over the distance $h$ between the points $i+1$ and $i+2$ is $t_{i+1}$, etc., until we define the time for a compressional pulse to travel from depth $i+n-1$ and $i+n$ to be $t_{i+n-1}$. Therefore, the $t_i$ are the data which is desired to be measured and recorded by the logging system. However, in practice the logging instrument, with a spacing S between the transducers employed in time interval determination, will measure the average of the various incremental time intervals $t_i$. Stated another way, with the spacing S equivalent to $Mh$ where M is the number of $h$'s over the spacing S, we find that the logging tool will measure a travel time $t_i+t_{i+1}+\ldots t_{i+M+1}$; or it can be calibrated to measure the interval travel time:

$$T_i = \frac{t_i + t_{i+1} + \ldots t_{i+M+1}}{M} \quad (1)$$

The general expression for a smoothing operation or moving-average operation is:

$$T_i = \sum_{j=-\infty}^{+\infty} C_j t_{i-j} \quad (2)$$

Figure 4:
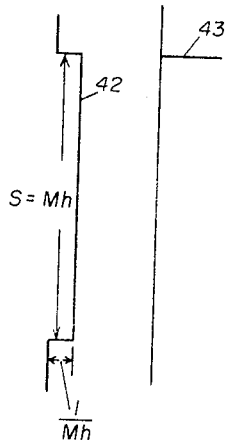
FIGURE 4 illustrates a typical impulse response of a velocity logging system and a desired theoretical spike response.

This expression states that some form of data $t_{i-j}$ has been smoothed by an operator whose coefficients are $C_j$ to produce smoothed data $T_i$. In accordance with the present invention, an inverse filter is derived in order to convert approximately the smoothing filter operator of Equation 2 to a spike function. In the specific example of a velocity logging system employed herein, $t_{i-j}$ are the incremental time intervals and $T_i$ are interval times resulting from the smoothing of times $t_{i-j}$. This filtering operation can now physically be represented for a velocity logging system by the waveform 42 of FIGURE 4. The impulse response of the velocity logging system is shown as having a length $Mh$ and a height or amplitude $1/Mh$. Thus, the instrument distortion or impulse response of the velocity logging system is one of a family of smoothing filters. In accordance with the present invention, an inverse filter is derived in order approximately to convert smoothing filters or instrument distortion to a spike function 43, shown in FIGURE 4.

The exact inverse filter for the expression of Equation 2 can be derived by satisfying the following conditions:

$$t_i = \sum_{j=-\infty}^{\infty} a_j T_{i-j} \quad (3)$$

where $$\frac{1}{M} \sum_{j=m}^{m+M+1} a_j = \begin{cases} 1 \text{ if } m=0 \\ 0 \text{ if } m \neq 0 \end{cases}$$

and $a_j$ = the amplitudes of inverse filter.

The resultant inverse filter would have a characteristic as illustrated in FIGURE 7B. However, if the exact inverse filter as illustrated in FIGURE 7B and by the expression of Equation 3 is applied to actual data, the results leave much to be desired. This is by reason of the presence of noise in the signal being filtered and the introduction by the filter itself of additional noise which completely dominates the output from the inverse filter. The noise present in the signal is due to several factors, including electronic noise in the instrumentation, drift of the amplifiers involved, and noise spikes which have been discussed heretofore. Actually, since the noise spikes can be removed, they do not present much of a problem with respect to filter design. However, the other types of noise do. A further type of noise is introduced by the inverse filter operating upon finite data and the filter itself possessing an infinite memory length. This effect, called truncation, will render useless any data which is produced from the filter. Therefore, another filter must be evolved, an optimum filter of finite memory length; one which will minimize the effects of noise. In order to do so, the actual data on the log must be defined as:

$$T'_i = T_i + N_i \quad (4)$$

where $T'_i$ is the actual time interval represented by the data, and
$N_i$ is the error due to various types of noise.

Since the error introduced by noise cannot be completely eliminated, the inverse operator must be designed to give as good an estimate $\hat{t}_i$ of the actual interval times $t_i$ as is possible from the recorded data $T'_i$. The result of filtering the data $T'_i$ with the optimum inverse operator can be denoted as:

$$\hat{t}_i = \sum_{j=L}^{K-L-1} a_j (T'_{i-j}) \quad (5)$$

where

K is the memory length of the inverse filter which may be further defined as the total number of coefficients comprising the filter, and
L is the filter lag or the length of data assimilated by the filter before an output signal is generated.

Figure 6:
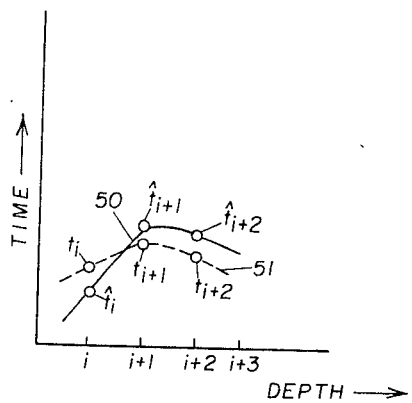

In order to select the proper coefficients for the inverse filter and thus to optimize the filter, there is employed the Wiener Criterion. Briefly stated, the Wiener Criterion is employed to minimize the error that may exist as between any true value of time interval $t_i$ and the estimated time interval $\hat{t}_i$ which will be produced by the filter. The error to be minimized has been graphically illustrated in FIGURE 6 wherein the curve 50 represents the variations of the estimated time increments generated by the inverse filter and the curve 51 represents the variations in values of the actual or the true time increments $t_i$. If the difference between $\hat{t}_i$ and $t_i$ and $t_{i+1}$ and $\hat{t}_{i+1}$, etc., can be minimized, there will be generated the best possible estimate of the actual time increments $t_i$.

The mean square error E between the curves 50 and 51 may be expressed by way of the Wiener Criterion as:

$$E = \langle (t_i - \hat{t}_i)^2 + (t_{i+1} - \hat{t}_{i+1})^2 + (t_{i+2} - \hat{t}_{i+2})^2 \ldots \rangle_{av} = \text{minimum} \quad (6)$$

or $$E = \langle \sum (t_i - \hat{t}_i)^2 \rangle_{av} = \text{minimum}.$$

The filter is thus optimized by optimizing the prediction error, that is to say, by minimizing the value of the error E.

It can be shown mathematically that from this process an expression of an optimum inverse filter may be derived and one which in accordance with the present invention is expressed as:

$$\sum_{k=-L}^{K-L-1} A_{jk} a_k = C_{-j} \quad (7)$$

where $A_{jk}$ are coefficients, and
$C_{-j}$ are values of the averaging operator.

The coefficients $A_{jk}$ are obtained by way of the expression:

$$A_{jk} = \begin{cases} \frac{1+R}{M} \text{ if } j=k \\ \frac{M-|j-k|}{M^2} \text{ if } |j-k| \leq M \text{ and } j \neq k \\ 0 \text{ otherwise.} \end{cases} \quad (8)$$

The coefficients or values for $C_{-j}$ are given by:

$$C_{-j} = \begin{cases} \frac{1}{M} \text{ for } j = -M+1, -M+2, -M+3 \ldots 0 \\ 0 \text{ for all other } j\text{'s.} \end{cases} \quad (9)$$

In both the expressions (8) and (9), $j$ and $k$ are integers.

It will also be noted that the expression for $A_{jk}$ includes the term R which has been introduced for the first time.

The term R refers to the ratio as between the noise power $P_N$ and signal power $P_S$. $P_N$ may be expressed as:

$$P_N = <N_m^2>_{av} \quad (10)$$

and the signal power $P_S$ as:

$$P_S = <t_m^2>_{av} \quad (11)$$

While neither $P_N$ nor $P_S$ can be calculated directly, yet it is known from experience and through experimentation what their ratios should be. It has been found that the system of coefficients for the inverse filter, determined by assuming a value $R = 0.1$, produces excellent results. However, it will be understood that this value of R is merely given as exemplary and not limiting upon the scope of this invention and that other values of R may be separately determined and found to give rise to improved information from data derived from different geographical areas.

Having established a range of values for R, there is now available all the information necessary for carrying out the method of the present invention. In FIGURE 8 there is illustrated in block schematic form a complete system for solution of the coefficients of the inverse filter and for convolving the determined inverse filter with the data $T'_i$ recorded on the velocity log.

The initial coefficients $A_{jk}$ are determinable by way of a properly programed digital computer 60 which solves the relationships set forth in Equation 8. On the other hand, simple analog computers are available for carrying out this solution. Indeed, the relationships are so simple as to be performed directly by an operator.

The values of $A_{jk}$ and $C_{-j}$ are now applied to the solution of Equation 7. The equation may be solved in the computer 61 by suitable programing if it be a digital computer. On the other hand, Equation 7 may be placed in matrix form and then expressed as a series of simultaneous equations to be solved by an analog arrangement as hereinafter described. The coefficients or values of the inverse filters $a_{-L} \ldots a_{K-L-1}$ are now applied to a convolver 62; and, if desired, these values may be recorded on a suitable printout mechanism 63 for future reference or to be employed in the determination of the amplifier gains and polarities of the outputs of the various heads that will comprise the inverse filter if it is in the analog form as represented in FIGURE 9.

The information $T'_i$, representing log data, is now applied to the convolver 62 which solves Equation 5 and produces an output signal representative of the incremental times $\hat{t}_L \ldots \hat{t}_{J-K+L}$. This information is now applied to the recorder 63. The recording will be a synthesis of a log that would have been made had the transducer elements been spaced closer together and if the formations had been undamaged.

With the minimum spacing log information now available, it is possible to produce a log of any desired spacing greater than the minimum spacing but preferably a multiple of the number of $h$'s of the minimum spacing log. From time to time, interpreters of logs desire that a number of logs be run of different spacing to aid in the interpretation of the subsurface conditions. In the past it has been necessary to run logs of different spacings, each time tying up valuable rig time. Now, in accordance with this invention it is possible to run but one log, a long spacing log, with minimum time error and to derive therefrom a log of almost any desired spacing. For example, having established a log of, for example, 0.5-foot spacing, and it is desired to produce a long of, for example, 3-foot spacing, the short spacing log information will now be applied to a moving-average operator represented by the filter 64 and the information smoothed out to produce a 3-foot log which is recorded by the recorder 65.

Now having generally set forth the operation and arrangement of FIGURE 8, there will not be assigned to the various functions involved in the solution certain values in order to review the operation again, but in greater detail.

In a typical operation involving the present invention, an inverse filter will be selected to length K approximately six times the length M or the number of units $h$ over the distance S representing the spacing between the transducers on the logging tool. The memory length K of the inverse filter will be about 120. The length of the original smoothing filter M will be 20. The lag L will be about 62 with R values from 0.02 to 0.625 or larger, depending upon the geographical area from which the original log data was achieved.

Figure 6A:
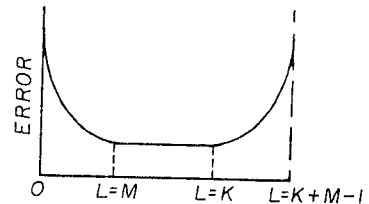
FIGURE 6A is a plot of the optimum inverse filter lag versus optimum filter error.

The amount of filter lag L is not arbitrary. As demonstarted in FIGURE 6A, there is a preferred range for the value of L, over which range the error plotted as a function of L is a minimum. This range is set by the limits of $L = M$ and $L = K$. And this is reasonable when it is realized that by setting the lag $L = M$, one is merely instructing the filter not to output a signal until all the information that has been effectively smoothed by the averaging operator of length M has been placed into the filter. In other words, the filter by determination of the value of lag is asked to produce an output signal only when all the information necessary for a correct answer has been placed into the filter.

The limit of $L = K$ merely satisfies a condition again that all the information necessary for a proper answer is within the filter. If L is greater than K, some of the information necessary for a correct answer has already been extracted from the filter and is no longer available. Accordingly, one would expect then that the filter lag beyond the limits of M or K would introduce greater error into the answer from the filter. This is verified by the characteristic of the plot of error versus filter lag L in FIGURE 6A. In the operation of the system to determine the proper filter characteristic, the filter lag should be set approximately at the center of the limits. A filter lag of 62 is satisfactory.

It will immediately be seen from examination of the various formulae that to write down the values of $A_{jk}$ and $C_{-j}$ for the conditions set forth above would be beyond the scope of this description and would needlessly burden it. However, in order to provide a more complete understanding of the solution of the various equations, there will be assigned values significantly smaller and to be considered only as exemplary of the operation of the formulae and are not necessarily suggested for use in the working embodiment of the invention or in the practice of the method thereof. With this understanding in mind, the following initial conditions are set: $M = 2$, $K = 4$, $L = 2$, $R = 0.2$. With the limits set for $k$ to extend from $-2$ to $+1$, the following table of values is determined for $A_{jk}$ by solution of Equations 8.

*Table A*

| | |
|---|---|
| $A_{-2,-2} = 0.6$ | $A_{0,-2} = 0$ |
| $A_{-2,-1} = 0.25$ | $A_{0,-1} = 0.25$ |
| $A_{-2,0} = 0$ | $A_{0,0} = 0.6$ |
| $A_{-2,+1} = 0$ | $A_{0,+1} = 0.25$ |
| $A_{-1,-2} = 0.25$ | $A_{1,-2} = 0$ |
| $A_{-1,-1} = 0.6$ | $A_{1,-1} = 0$ |
| $A_{-1,0} = 0.25$ | $A_{1,0} = 0.25$ |
| $A_{-1,+1} = 0$ | $A_{+1,+1} = 0.6$ |
| $A_{0,-2} = 0$ | |

Now by substituting the proper values in Expression 9, there is obtained the following values for the coefficients $C_{-j}$:

*Table B*

$C_{+2} = 0$
$C_{+1} = 0$
$C_0 = 0.5$
$C_{-1} = 0.5$

With the coefficients $A_{jk}$ and $C_{-j}$ available, they are fed to the simultaneous equation solver 61 for generation of signals representative of the coefficients of the inverse filter. As stated above, there are many ways of solving these equations, including analog systems. One form of analog system is of the type shown in FIGURE 10. For convenience, we may write Equation 7 in matrix form and obtain the following:

$$\begin{bmatrix} A_{-L,-L}, & A_{-L,-L+1}, & A_{-L,-L+2}, & \ldots & A_{-L,K-L-1} \\ A_{-L+1,-L}, & A_{-L+1,-L+1}, & A_{-L+1,-L+2} & \ldots & A_{-L+1,K-L-1} \\ A_{-L+2,-L}, & A_{-L+2,-L+1}, & A_{-L+2,-L+2} & \ldots & A_{-L+2,K-L-1} \\ \vdots & & & & \\ A_{K-L-1,-L}, & A_{K-L-1,-L+1}, & A_{K-L-1,-L+2} & \ldots & A_{K-L-1,K-L-1} \end{bmatrix} \begin{bmatrix} a_{-L} \\ a_{-L+1} \\ a_{-L+2} \\ \vdots \\ a_{K-L1} \end{bmatrix} = \begin{bmatrix} C_L \\ C_{L-1} \\ C_{L-2} \\ \vdots \\ C_{L-K+1} \end{bmatrix} \quad (12)$$

Now by substituting the previously determined values of $A_{jk}$ and $C_{-j}$ into the matrix of Equation 12, there is obtained:

$$\begin{array}{c} A_{jk} \\ \begin{bmatrix} 0.6 & 0.25 & 0 & 0 \\ 0.25 & 0.6 & 0.25 & 0 \\ 0 & 0.25 & 0.6 & 0.25 \\ 0 & 0 & 0.25 & 0.6 \end{bmatrix} \end{array} \begin{array}{c} a_k \\ \begin{bmatrix} a_{-2} \\ a_{-1} \\ a_0 \\ a_1 \end{bmatrix} \end{array} = \begin{array}{c} C_{-j} \\ \begin{bmatrix} 0 \\ 0 \\ 0.5 \\ 0.5 \end{bmatrix} \end{array} \quad (13)$$

From the matrix set up in Equation 13 there may be derived the following simultaneous equations to be solved by the analog computer of FIGURE 10:

$$\begin{aligned} 0.6a_{-2} + 0.25a_{-1} + 0a_0 + 0a_1 &= 0 \\ 0.25a_{-2} + 0.6a_{-1} + 0.25a_0 + 0a_1 &= 0 \\ 0a_{-2} + 0.25a_{-1} + 0.6a_0 + 0.25a_1 &= 0.5 \\ 0a_{-2} + 0a_{-1} + 0.25a_0 + 0.6a_1 &= 0.5 \end{aligned} \quad (14)$$

The analog computer of FIGURE 10 is one of many available in the art and is of the type disclosed at pages 64, 65 of Electronic Analog Computers by Korn and Korn, McGraw-Hill, 1946, second edition. In this form of simultaneous equation solver, there are provided a number of networks 60, 70, 80, and 90—equal in number to the number of points to be employed in defining the inverse filter. Likewise, in each of the networks, taking network 60 as exemplary, there are included potentiometers 61, 62, 63, and 64—again, equal in number to the number of points defining the inverse filter. In practice, the inverse filter will be defined by approximately one hundred twenty points, and accordingly there would be required in a practical embodiment one hundred twenty of the networks—each including one hundred twenty of the potentiometers. It is now evident why a more simple example was chosen for purpose of this description. Each of the terminals 65, 75, 85, and 95 of the networks is respectively connected to a source of potential whose amplitude represents the values of $C_{-j}$. Thus, the network 60 associated with the first equation of the Equations 14 will have its terminal 65 connected to a zero amplitude source of potential represented as a ground connection. Each of its potentiometers 61, 62, 63, and 64 will be set respectively with the coefficients $A_{jk}$, which values are taken from the coefficients of the first equation. Accordingly, potentiometer 61 will be set for a value of .6, potentiometer 62 will be set for a value of .25, and potentiometers 63 and 64 will be set for values of zero. Each of the potentiometers will have applied to it two potentials of equal magnitude but opposite polarity and each representative in the balanced condition of the networks of a value of the inverse filter. Thus, by setting each of the potentiometers, we can either obtain by placing the movable contact at one extreme the full positive value of the inverse filter amplitude or the full negative value. With the potentiometer set at a midposition, a zero potential will be selected corresponding to an $A_{jk}$ value of zero.

The terminal 75 of network 70 which is associated with the second equation of Equations 14 will be connected to ground, representing a $C_{-j}$ value of zero; and each of the contacts of the potentiometers 71, 72, 73, and 74 will be set in accordance with the $A_{jk}$ coefficient values set forth in the second equation.

The terminal 85 of network 80 will be connected to a battery 86, representing a potential source of value representing the value of the $C_{-j}$ function in the third equation of Equations 14. This value is, in our example, one-half volt. The terminal 95 of network 90 will also be connected to a battery 96 which has a potential value of one-half volt, corresponding with the value of $C_{-j}$ in the fourth equation of Equations 14. The outputs of each of the networks 60, 70, 80, and 90, respectively, are applied to D.-C. amplifiers 67, 77, 87, and 97. Recording voltmeters which may be of the digital or analog variety are connected to the outputs of the amplifiers 67, 77, 87, and 97 to record the values of the $a_j$ functions defining the inverse filter when the networks come to balance. From direct readings of these voltmeters 68, 78, 88, and 98, there will be obtained the values defining the inverse filter; and these values will be applied to the input of the convolver 62 of FIGURE 8 and will define an inverse filter whose impulse response will be the inverse of the average operator which has been considered in this description as the distortion introduced into the recorded data $T'_i$ of the velocity log. Similarly, this information may be employed as hereinafter described in determining an inverse filter for an analog system as shown in FIGURE 9.

Now that there has been fully described the method of the present invention together with the technique employed in deriving the desired characteristic of the inverse filter, there will now be described yet another arrangement, an analog form, for carrying out the method of the present invention in field operations. The arrangement of FIGURE 9 is uniquely suited for operations in the field so that there may immediately be produced a plurality of representations of interval time information, including the long spacing log, the minimum spacing log, and some log in which the spacing between the detectors or transducers is intermediate the aforementioned spacings.

In FIGURE 9, a logging tool 100 is lowered through a borehole 101 by way of a cable 102, passing over sheave 103 to determine the velocity characteristics of formations 104 adjacent the borehole. The logging tool 100 is shown as a two-receiver tool including a transmitter T, a first receiver $R_1$, and a second receiver $R_2$. As is well known to those skilled in the art, the time interval measurement is made in response to the production of signals corresponding with the arrival at the receivers $R_1$ and $R_2$ of energy from the transmitter T refracted along a path through the formations 104. Accordingly, the distance between the receivers $R_1$ and $R_2$ will be denoted S and represents the length of the averaging filter for which the inverse is determined in accordance with the previous description. The signals from the receivers $R_1$ and $R_2$ are transmitted uphole by way of cable 102 to a surface unit 105 which produces an output signal representative of the measured time interval T'. This information is applied by way of conductor 106 to an input of the recorder 107. Trace 108 on the chart of recorder 107 indicates the instantaneous values of the function T'. The chart of the recorder 107 is driven in accordance with the movement of the logging tool 100 along the borehole so that the time information will be plotted with respect to depth. The chart drive includes a synchrotransmitter 110 driven from the sheave 103 and electrically connected by way of conductors 111 to a synchroreceiver 112 mechanically connected to the chart drive mechanism of the recorder 107 by way of mechanical coupling illustrated as dashed line 113.

Simultaneously, the interval velocity information T' is applied by way of a noise filter 120 to a record head 121 of a tape recording system including a magnetic belt 122. Preferably, the information T' will be FM modulated by way of a modulator 123 prior to application to the record head 121 in order to obtain maximum resolution of the recording and playback of information.

Magnetic tape belt 122 is driven by way of a synchroreceiver 124 coupled to tape roller 125 by way of gear box 126. The synchroreceiver is electrically connected by way of conductor 127 to the synchrotransmitter 110. As the tape moves, it carries the recorded information toward the pickup heads 130, 130a, 130b, and 130n. The number of pickup heads will be determined by the number of points defining the inverse filter or inverse operator. Time domain filters are now available on the market with at least one hundred pickup heads and would be suitable for use in the system of the present invention. Each of the pickup heads 130–130n is respectively connected to an FM demodulator 131–131n and in turn to amplitude- and polarity-determining devices 132–132n. Each of these devices will include an amplifier and a polarity-reversing switch, with the amplifiers being of variable gain to establish the amplitudes of each of the points defining the inverse operator and the polarity switch establishing whether the signal is positive or negative. For further details concerning the amplitude-weighting and the polarity-reversing arrangement, reference may be had to U.S. Patent 3,076,177 of Lawrence and Foster, issued January 29, 1963, and more particularly to FIGURE 9 thereof.

With the inverse filter properly defined by adjustment of the elements 132–132n, the input signal T' is now convolved by the filter comprising the heads 130–130n, and the outputs of the elements 132–132n are applied to a summing network or amplifier 133. The sum signal which represents $\hat{t}_i$ is applied by way of conductor 134 to the input of recorder 135 where the values are recorded as trace 136 on a chart of the recorder. These values are recorded with respect to depth by reason of the chart's being driven by way of mechanical connection shown as the dashed line 137 which is coupled to the synchroreceiver 112. By this means, there is made immediately available at the wellhead and during logging operations a derived short spacing log as represented by trace 136 immediately available for study and review by the geologist or geophysicist present at the well site.

If the geologist or geophysicist has decided beforehand that he also wants a log that would have been made had the receiver spacing been some distance intermediate S and the shortest distance which gave rise to the synthetic log 136, such information may immediately be presented and in the following manner.

It will be recalled that there is available on conductor 134 the values $\hat{t}_i$, the values which represent the time interval derived by way of an imaginary logging tool of spacing, for example, 0.5 foot between the transducer elements. This information is now applied by way of conductor 140 and frequency modulator 141 to a record head 142. The recorded data is carried by way of a tape belt 122 to the spaced heads 150–150n which, with associated elements to be described, constitute an averaging operator. The outputs of the heads 150–150n are applied to frequency demodulators 151–151n and thence to amplitude- and polarity-determining combinations 152–152n. These elements comprise an amplifier for determining the amplitude or weighting factor to be ascribed to the outputs of each of the heads 150–150n and a polarity-determining network which may be a reversing switch. The number of heads 150–150n will be determined by the character of the averaging operator or moving-averaging operator which in turn will determine the type of log to be derived. For example, we know from prior discussion that the length of the averaging operator may be defined by M. If M is selected to be 2, and if $h$ is ½, then there will be produced a log at the output of a summing network or amplifier 153 equivalent to a velocity log that would have been produced had the elements or transducers of the logging tool been spaced 1 foot apart. For the same reason, if M is 6, then a 3-foot log would result; and if M is 12, then a 6-foot log would result. The number of heads to be employed in the moving-average operator will be determined by the value of M. Thus, if M is 2, the first two heads will be employed; and from the relationships previously developed, we know that the amplitude of the square wave which defines the moving-average operator will be ½. Therefore, by proper adjustment of the gain and polarity of the elements 152–152n, there may be constructed a moving-average operator which will produce, from the minimum spacing log, logs that would have been produced if the spacing between the transducers of the logging tool were increased.

Accordingly, the system of FIGURE 9 produces at the well site a plurality of logs which accurately and with varying degrees of resolution depict the velocity characteristics of subsurface earth formations; and this information is made possible with but one run of the logging tool through the borehole.

If desired, erase heads 160 and 162 may be provided and energized from either a single source of supply or, as shown, each respectively energized from sources of erase current provided by oscillators 161 and 163. The erase heads are made optional in the present embodiment since frequency modulation is employed. It has been the experience that when frequency modulation is employed in the recording system, erase heads are not necessary inasmuch as the recording takes place at all times near saturation conditions.

The spacing between the heads 130–130n and the spacing between the heads 150–150n is determined by a number of factors including the velocity with which the logging tool 100 moves along the wellbore, the speed of the tape belt 122, and the spacing selected for the derived time interval log as produced at the output of the summing amplifier 133. Thus, for example, if the logging tool 100 is moving at a velocity of one hundred feet per minute, the tape belt is moving at fifteen inches per second and the spacing desired for the derived time interval log is one half foot, the heads 130–130n would be spaced four and one-half inches apart. On the other hand, if the tape belt 122 is moved at one inch per second and all other conditions hold, then the heads 130–130n would be spaced 0.3 inch apart. The spacing of the heads will in many instances be a function of the equipment available for performing the inverse operating procedure in the field and may require variations in tape belt speed or changes in the velocity of movement of the logging tool in order to meet limitations of available tape recording equipment.

The criterion set forth for spacing the heads 130–130n is also applicable to the spacing between heads 150–150n.

While the invention has been described in connection with certain specific embodiments thereof, it will now be understood that further modifications will suggest themselves to those skilled in the art; and it is intended to cover such modifications as fall within the scope of the appended claims.

What is claimed is:

1. In geophysical exploration, the method which comprises the steps of:
   (a) generating as a dependent variable a first function controlled by an earth characteristic and which function has been filtered by an operator whose impulse response is a moving-average characteristic, and (b) passing said first function through a system having an impulse response which converts said moving-average characteristic to a spike function to render said first function more representative of said earth characteristic and more free from system distortion.

2. In geophysical exploration, the method which comprises:

(a) generating a geophysically dependent variable function by way of a first system whose impulse response includes as a characteristic an averaging operator, and (b) passing said variable function through a second system which is characterized by an impulse response which converts said first-named impulse response to a spike-like function to render the variable function more free of system distortion and more definitive of the geophysical condition giving rise to said function.

3. The method of improving the resolution of a well log which comprises:

(a) progressively applying to the well log as a whole inverse filtering required to transform an averaging function approximately to a spike function, and (b) recording the results of said filtering.

4. The method of improving the resolution of a well log which comprises:

(a) progressively applying to the well log as a whole inverse filtering required to transform an averaging function to a spike function, (b) applying to the transformed well log an averaging function to smooth out the representation of the transformed log, and (c) recording the results of said smoothing step.

5. The method of processing well logging data which comprises:

(a) generating as a dependent variable a time function controlled by an earth characteristic, (b) applying to said time function an averaging function to smooth out the representation of the time function, and (c) recording the result of said smoothing step.

6. The method of improving the resolution of velocity well logging data, which data includes noise spike signals, comprising the steps of:

(a) removing noise spike signals from said data to produce a modified representation of said data, (b) progressively applying to the modified data as a whole inverse filtering required to transform an averaging function to a spike function, (c) applying the transformed well log to an averaging operator to smooth out the representation of the transformed log, and (d) recording the results of said smoothing step.

7. The method of improving the resolution of velocity well log data which comprises:

(a) progressively applying the well log data as a whole to an inverse filter having an impulse response to transform the effect of an averaging operator approximately to a spike function, said filter being defined by the expression:

$$\sum_{k=-L}^{K-L-1} A_{jk}a_k = C_{-j}$$

wherein:

$a_k$ represents coefficients definitive of the inverse filter, $A_{jk}$ represents coefficients whose values are related to the characteristics of the averaging operator over a selected range of filter lag L, $C_{-j}$ represents coefficients definitive of the averaging operator over said range of L, $k$ takes on successive values which vary from minus L to K minus L minus 1, and $j$ takes on successive values which vary from minus L to K minus L minus 1; and (b) recording the result of said filtering.

8. The method of transforming a geophysically dependent variable function filtered by a moving average operator into a function more representative of the geophysical condition upon which said function is based, comprising:

(a) inverse filtering said geophysical dependent variable function to develop said function more representative of said geophysical condition where said inverse filtering operation is defined by coefficients $a_k$ for transforming to a spike function the effect of said moving average operator, said coefficients $a_k$ being dependent upon said moving average operator and said dependent variable function by satisfying the following expression:

$$\sum_{k=-L}^{K-L-\text{unity}} A_{jk}a_k = C_{-j}$$

where:

$C_{-j}$ represents coefficients definitive of the averaging operator over a selected range of filter lag L, $A_{jk}$ represents coefficients whose values are related to the characteristics of the averaging operator over said selected range of filter lag L, wherein the terms $A_{jk}$ and $a_k$, $k$ takes on successive values from minus L, minus L plus 1, minus L plus 2 . . . K minus L minus 1, and in the terms $A_{jk}$ and $C_{-j}$, $j$ takes on successive values from minus L, minus L plus 1, minus L plus 2 . . . K minus L minus 1; and (b) recording said dependent variable function as modified by the inverse filtering thereof.

References Cited by the Examiner
UNITED STATES PATENTS

| | | | |
|---|---|---|---|
| 2,864,072 | 12/1958 | Blake | 340—3 |
| 3,061,813 | 10/1962 | Geyer | 340—3 |
| 3,076,177 | 1/1963 | Lawrence et al. | 340—3 |
| 3,209,317 | 9/1965 | Webster | 340—15.5 |

BENJAMIN A. BORCHELT, *Primary Examiner.*

R. M. SKOLNIK, *Assistant Examiner.*

UNITED STATES PATENT OFFICE
CERTIFICATE OF CORRECTION

Patent No. 3,275,980

September 27, 1966

Manus R. Foster

It is hereby certified that error appears in the above numbered patent requiring correction and that the said Letters Patent should read as corrected below.

Column 1, line 14, for "revolution" read -- resolution --; line 63, for "likely" read -- unlikely --; line 71, for "desirable" read -- desirable; --; column 2, line 1, for "for", second occurrence, read -- of --; column 6, for that portion of Equation 5, reading "j=L" read -- j=-L --; column 6, lines 38 to 39, for that portion of Equation 6, reading "$+(t_{i+2}-t_{i+2})^2$" read -- $+(t_{i+2}-\hat{t}_{i+2})^2$ --; column 7, line 68, for "long" read -- log --; line 74, for "not" read -- now --; column 8, line 4, for "to" read -- of --; column 8, in Table A, first column, line 64, strike out "$A_{0,-2}=0$ --; columns 9 and 10, Equation 12, under the heading "$(a_k)$" line 2 thereof, for "$a_{-L}1$" read -- $a_{-L+1}$ --; same equation, under the heading "$(a_k)$", line 4 thereof, for "$a_{K-L1}$" read -- $a_{K-L-1}$ --; column 14, line 43, for "wherein" read -- where in --.

Signed and sealed this 29th day of August 1967.

(SEAL)
Attest:

ERNEST W. SWIDER
Attesting Officer

EDWARD J. BRENNER
Commissioner of Patents